(12) United States Patent
Reagor

(10) Patent No.: US 6,263,189 B1
(45) Date of Patent: Jul. 17, 2001

(54) NARROWBAND HIGH TEMPERATURE SUPERCONDUCTING RECEIVER FOR LOW FREQUENCY RADIO WAVES

(75) Inventor: David W. Reagor, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/161,162

(22) Filed: Sep. 25, 1998

Related U.S. Application Data

(60) Provisional application No. 60/060,237, filed on Sep. 29, 1997.

(51) Int. Cl.⁷ .................................................. H04B 13/02
(52) U.S. Cl. .............................. 455/40; 455/41; 324/248
(58) Field of Search ........................ 455/40, 41, 42; 324/248; 505/162, 846; 257/31

(56) References Cited

U.S. PATENT DOCUMENTS

| | | | |
|---|---|---|---|
| 3,622,881 | * 11/1971 | Silver et al. | 324/248 |
| 4,389,612 | * 6/1983 | Simmonds et al. | 324/248 |
| 4,777,652 | 10/1988 | Stolarczyk . | |
| 4,906,930 | * 3/1990 | Nakane et al. | 324/248 |
| 5,218,297 | * 6/1993 | Nakane et al. | 324/248 |
| 5,656,937 | * 8/1997 | Cantor | 324/248 |
| 5,854,492 | * 12/1998 | Chinone et al. | 257/31 |
| 5,955,400 | * 9/1999 | Yokosawa et al. | 505/162 |

FOREIGN PATENT DOCUMENTS

| | | | |
|---|---|---|---|
| 97/15955 | * 5/1997 | (WO) | H01L/39/22 |

OTHER PUBLICATIONS

Stuart A. Wolf. John R. Davis, and Martin Nisenoff, "Superconducting Extremely Low Frequency (ELF) Magnetic Field Sensors for Submarine Communications," IEEE Transactions on Communications, vol. COM–22, No. 4, Apr. 1974.

* cited by examiner

*Primary Examiner*—Nay Maung
*Assistant Examiner*—Quochien B. Vuong
(74) *Attorney, Agent, or Firm*—Ray G. Wilson

(57) ABSTRACT

An underground communicating device has a low-noise SQUID using high temperature superconductor components connected to detect a modulated external magnetic flux for outputting a voltage signal spectrum that is related to the varying magnetic flux. A narrow bandwidth filter may be used to select a portion of the voltage signal spectrum that is relatively free of power line noise to output a relatively low noise output signal when operating in a portion of the electromagnetic spectra where such power line noise exists. A demodulator outputs a communication signal, which may be an FM signal, indicative of a modulation on the modulated external magnetic flux.

9 Claims, 8 Drawing Sheets

NARROWBAND HIGH TEMPERATURE SUPERCONDUCTING RECEIVER FOR LOW FREQUENCY RADIO WAVES

RELATED CASES

This application claims the benefit of the filing date of U.S. provisional application No. 60/060,237 filed Sep. 29, 1997, and incorporated herein by reference.

This invention was made with government support under Contract No. W-7405-ENG-36 awarded by the U.S. Department of Energy. The government has certain rights in the invention.

BACKGROUND OF THE INVENTION

This invention relates to high temperature superconducting devices, and, more particularly, to the adaptation of high temperature superconducting quantum interference devices for radio communication.

In underground areas, such as mines, tunnels, boreholes, and the like, there is a need to communicate between personnel, equipment, etc., including mobile communication. Solutions of the electromagnetic wave equations in a conducting medium show that the signal strength, in both electric and magnetic fields, varies as $\exp(-z/\delta)$, where z is the distance from the surface of the conducting medium and $\delta$ is the penetration depth, given by $\delta=(2\rho/\mu\omega)^{1/2}$. Here, $\omega$ is the angular frequency, $\rho$ is the resistivity of the medium, and the source is a plane wave from above the surface. For typical sedimentary rocks, $\rho \cong 100$ $\Omega$-m, implying that radio frequency signals above about 500 kHz travel less than 10 meters into rock masses.

The ground penetrating signals are much larger at low frequencies, but the receivers for these low frequencies usually require a very large antenna (on either the transmit or receive side) to overcome the electrical noise of typical semiconductor components. For example, one mine paging system uses a transmit antenna several kilometers in diameter to achieve sufficient amplitude to drive a conveniently sized wirewound ferrite core receiver.

The difficulty of direct radio wave communication in underground areas has led to various attempts to communicate underground, e.g., using tunnel structures as transmission lines or using leaky coaxial cable with repeaters. But these attempts suffer from a limited range and/or are easy to interrupt. In short, a satisfactory wireless underground mobil communication system does not exist.

The critical performance parameter for communicating at these low frequencies is the noise of the receiver. Superconducting components have the lowest noise of any electronics technology and have been used in applications where an extremely low noise floor is critical, such as radio astronomy, noninvasive magnetoencephalography, or various scientific instruments. Superconductors are divided into two classes: low temperature superconductors that require liquid helium (4 Kelvin) to operate and high temperature superconductors (HTS) that require liquid nitrogen (77 Kelvin) to operate. The former requires a large cryogenic enclosure and cannot be used in a man-portable application. The latter requires cryogenic volumes no larger than a coffee cup; e.g., a 100 cubic cm of liquid nitrogen is easily sufficient for an 8 hour shift. The entire cryogenic system weight for a thin film device may then be reduced to under one kilogram.

Thus, it is an object of the present invention to provide direct mobile radio communication to underground areas.

It is another object of the present invention to provide a portable high temperature superconducting device for low noise communication.

One other object of the present invention is to provide a compact yet sensitive low frequency receiver.

Additional objects, advantages and novel features of the superconducting receiver will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise an underground communicating device having a low-noise SQUID with a high temperature superconductor structure connected to detect a modulated external magnetic flux for outputting a voltage signal spectrum that is related to the modulated magnetic flux. A receiver receives the modulated voltage signal and outputs a communication signal, which may be an FM signal, indicative of a modulation on the external magnetic flux. In a preferred embodiment, the SQUID is formed with the Josephson junctions located away from locations of the SQUID that are susceptible to flux trapping so that the sensitivity of the SQUID is maintained during long periods of operation in the earth's magnetic field. In a particular embodiment, the receiver includes one or more narrow bandwidth filters, where each filter has a bandwidth that is relatively free of noise from the external noise spectra. Multiple filters may be used to increase the total system bandwidth.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

In accordance with this invention, a Superconducting Quantum Interference Device (SQUID) is used as the superconducting component in a low frequency communication device. This device uses two Josephson junctions connected in parallel to form a small ring. When biased with a small current, the voltage across the device is very sensitive to the magnetic flux passing through the center of the ring. SQUIDs are well known devices and are not per se the subject of this invention.

In a recent development, relatively low cost HTS SQUIDs are fabricated using a SNS (Superconductor-Normal-Superconductor) edge junction process, as described in PCT Patent Application WO 97/15955, "High Temperature Superconducting Josephson Junctions and Squids," by Q. X. Jia et al., published May 1, 1997, incorporated herein by reference. The superconducting electrodes are Ag doped $YBa_2Cu_3O_7$ (YBCO) and the normal layer is $PrBa_2Cu_3O_7$ (PBCO). This process has produced SQUIDs with modulation amplitudes exceeding 150 $\mu V/\Phi_0$ and a flux noise of 5 $\mu\Phi_0/\sqrt{Hz}$ at 76 Kelvin. The devices are produced by successive layers of deposition, lithography, and etching on single crystals. The device location on the crystal is not restricted so that step and repeat patterning can be used. This manufacturing process allows simultaneous production of numerous identical circuits on an individual crystal, which is then cut into many circuits for a low cost per circuit.

In practice, the SQUID is used as a null detector. The direct output voltage is a periodic function of the applied magnetic flux and is difficult to interpret directly in real time, so a feedback circuit is used to keep the SQUID at constant flux and the measured flux is equal and opposite to the feedback flux. The feedback circuit, called a FLL (flux locked loop), modulates the SQUID flux with an alternating current (ac) at a high frequency and uses a lock-in amplifier circuit to isolate the voltage component at the modulation frequency. This modulation is provided via a small coil installed in the dewar next to the SQUID and is distinct from the modulation of the external magnetic field that carries a signal to be received. This voltage component is then integrated to generate a feedback voltage to drive the feedback coil. The FLL and its operation are conventional for use with SQUIDs and are well known to persons with ordinary knowledge of SQUIDs.

Figure 1:
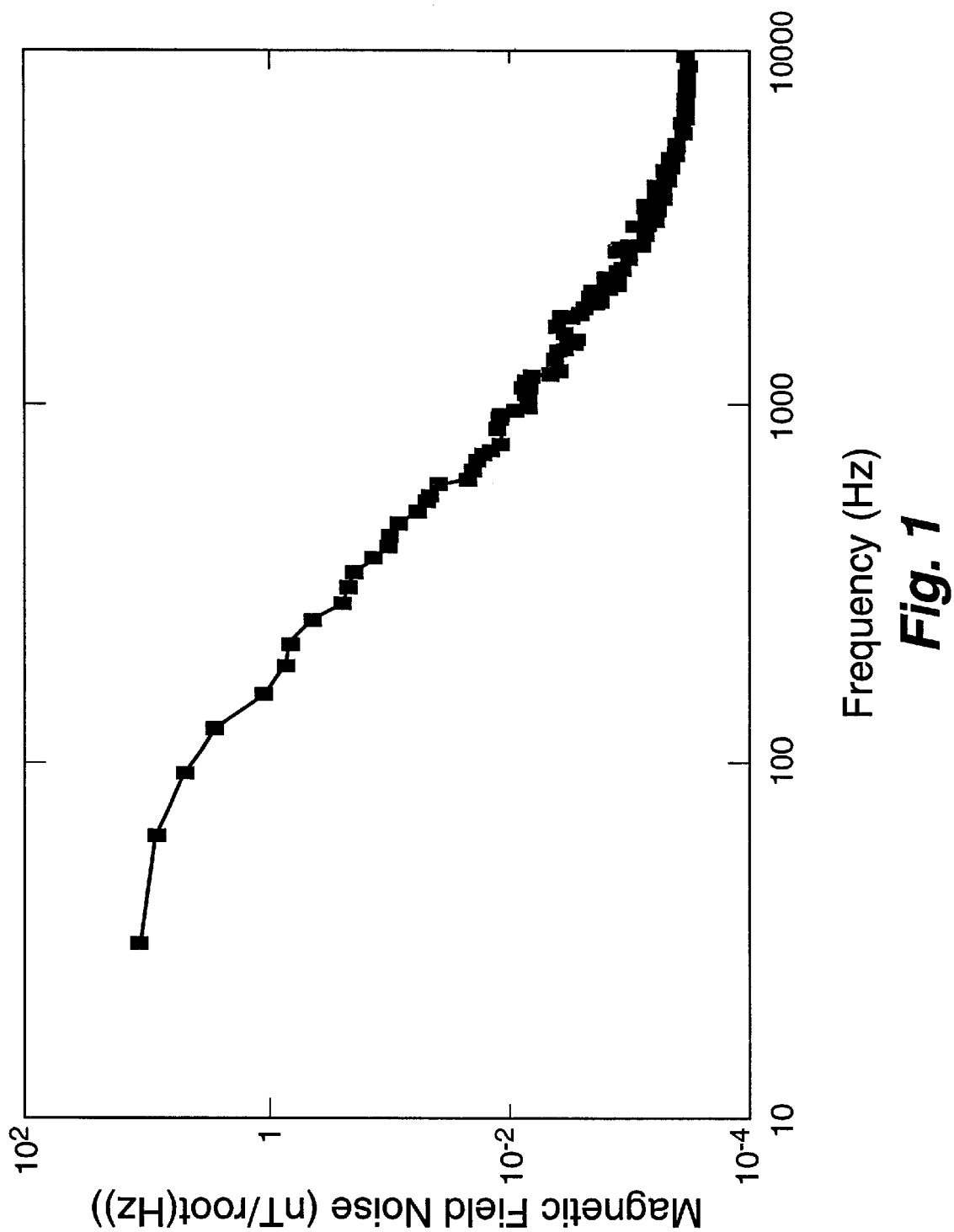
FIG. 1 graphically illustrates a typical magnetic field spectrum taken with a commercial SQUID.
Figure 8:
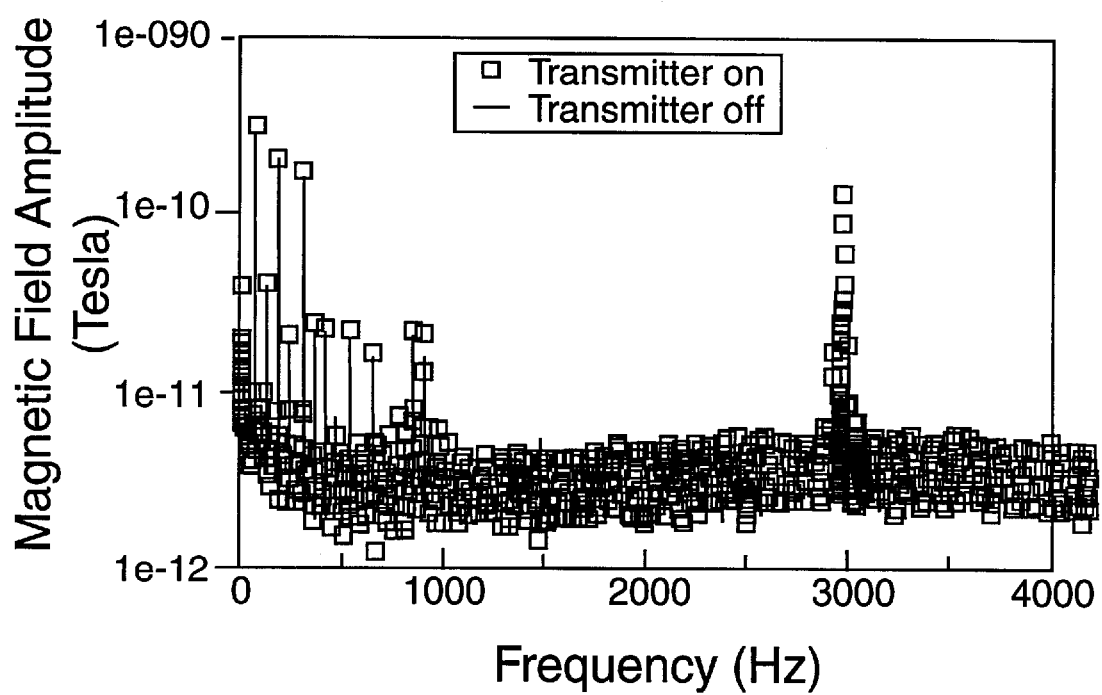
FIG. 8 illustrates the background noise and transmission signal in an underground environment.

As with any receiver, the noise background found in the environment, both natural and man-made, may be large enough to dominate the receiver noise and make the advantages of a low noise receiver negligible. FIG. 1 illustrates a typical magnetic field noise spectrum taken with a commercial SQUID at an above-ground location. The spectrum was taken over a wide frequency range. A large background noise (over 10 nTesla/$\sqrt{Hz}$) is seen at low frequencies. The noise drops about five orders of magnitude with increasing frequency to a value below 1 pTesla/$\sqrt{Hz}$ above 5 kHz. FIG. 8, discussed below, illustrates background noise at an underground location.

Figure 2:
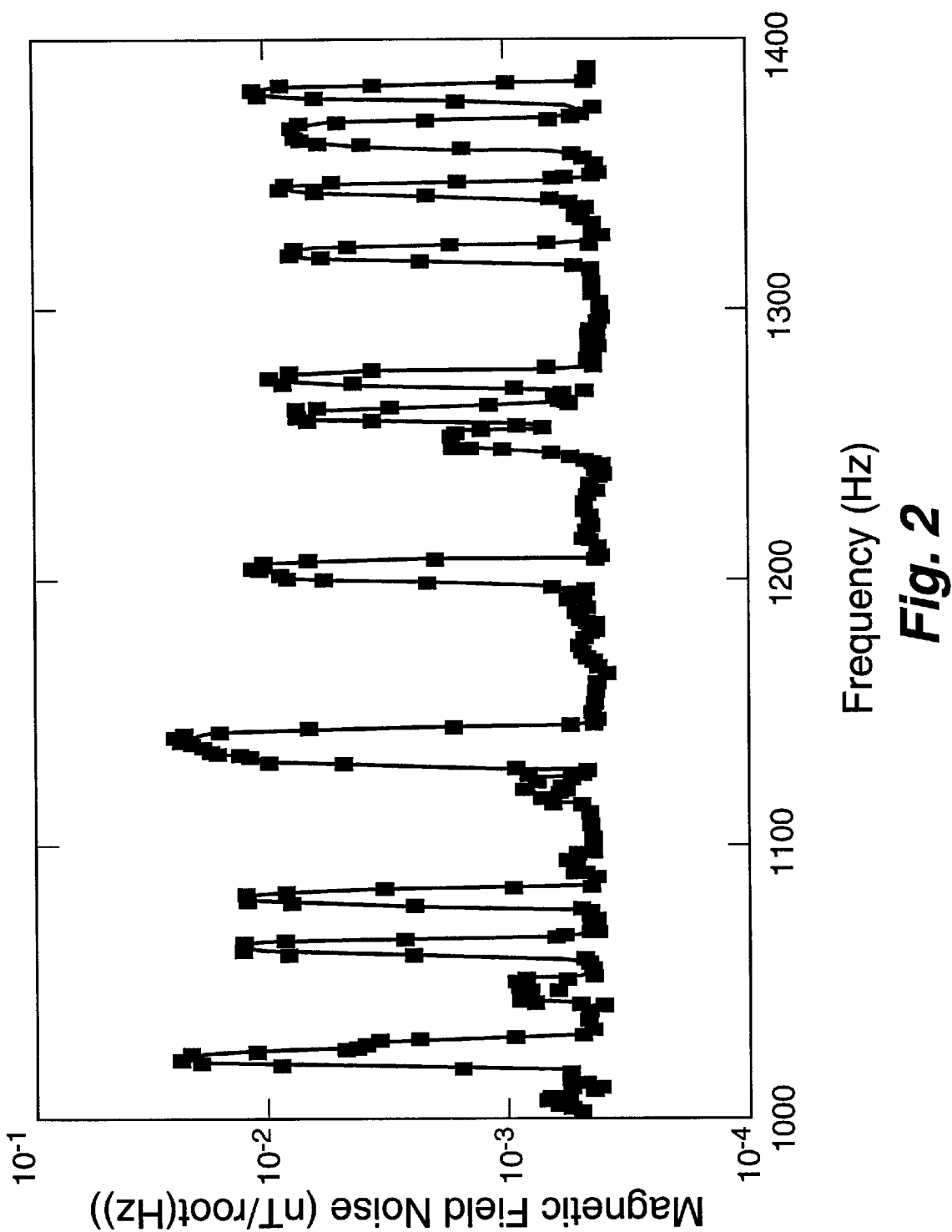
FIG. 2 shows a portion of the spectrum of FIG. 1 that is illustrative of power line noise peaks.

When observed on an expanded scale, shown in FIG. 2, the noise is seen to be power line synchronized for the particular noise spectra and separated into a series of peaks, most of them harmonically related to 60 Hz. Power line noise is relatively ubiquitous in the U.S. and is a design consideration in an embodiment for use in noisy locations. The noise floor between the peaks is the SQUID noise floor, again limited by the dynamic range of the FLL. These deep minima likely extend to the intrinsic SQUID noise floor and act as windows in which to transmit and receive a narrow bandwidth signal.

Thus, the present invention may include a receiver with a bandwidth that operates in at least one of the available windows between adjacent noise spectra (minima shown in FIG. 2) if needed to accommodate external noise. Since the windows may be harmonically related to the 60 Hz power line signal in the exemplary spectrum, a maximum bandwidth of about 60 Hz is contemplated. A minimum bandwidth of 0.1 Hz may be required, however, in certain portions of the noise spectra. But it is contemplated that noise spectra will be determined for individual applications and the bandwidths selected to operate the SQUID at the low noise floor of the SQUID for maximum sensitivity. In some instances, a plurality of bandwidth channels may be provided to operate in a plurality of windows in order to increase the overall bandwidth for system operation.

It will be understood that the bandwidth feature of the receiver may be provided by a number of electronic elements, from passive LC-type filters to more active solid state devices. The selection of any particular system is within the capability of an ordinary skill in electronics technology and such selection is within the scope of the present invention.

Figure 3:
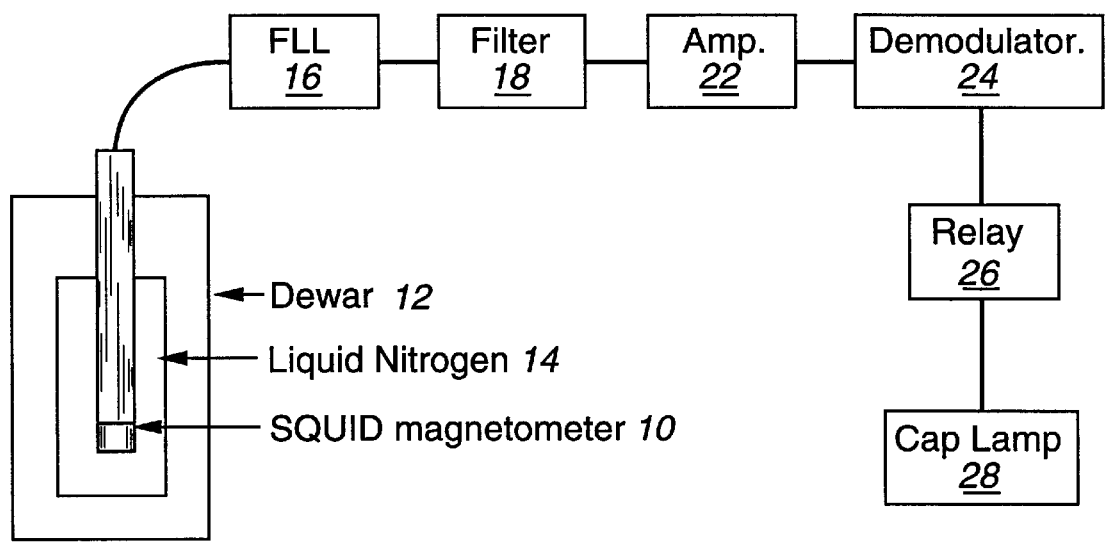
FIG. 3 depicts in block diagram form a communicating device according to one embodiment of the present invention.

The design of a suitable receiver subsystem is shown in FIG. 3. The SQUID element 10 is enclosed within dewar 12, which has sufficient volume of liquid nitrogen 14 to operate for at least eight hours. SQUID 10 itself has a field response that is nonlinear and is typically operated with a FLL 16 that keeps its operating point fixed. The output of FLL 16 is a voltage that is proportional to the magnetic field.

The output from FLL 16 contains too much information, i.e., all ac signals up to the bandwidth of FLL 16. The following stage is one or more filters 18–20 that separate the frequencies of interest (see FIG. 1 or 2) from the full spectrum. Suitable filters can be formed from a high Q LC resonator or a switched capacitor filter. Alternatively, the spectra shown in FIG. 1 can be filtered with a high pass filter having a cutoff frequency that is high enough to be above the noisiest part of the power line noise spectra and low enough to have sufficient ground penetration to the depths of interest. A exemplary range of such relatively high frequency operation is 1–4 kHz. The output signal of filters 18–20 is then sent to a secondary amplifier 22 to output signals with at least 50 mV for use by demodulator circuit 24 to lock, since noise limits the gain of FLL 16 to modest values. A wider bandwidth may be needed for some applications than is provided by a single window. Then a plurality of filters may be provided in parallel to form multiple channels that provide a relatively wide composite bandwidth. The amplifier/demodulator components, discussed below, may also be duplicated in parallel systems with the filters if needed by a particular design application.

In a preferred embodiment, demodulator 24 is primarily another phase lock circuit, used in a frequency tracking mode. The phase lock output is a voltage that is proportional to the frequency difference between the input signal frequency and the center frequency of the circuit, i.e., a frequency modulated (FM) signal. The FM demodulated signal is then sent to a voltage comparator so that positive voltages from the FM demodulator saturate a switch to ground in order to sink substantial current from the output.

Thus, the output signal from demodulator 24 may be a series of pulses indicative of a received signal. The output signal is then connected to an output device that provides a visible or audible indication of a received signal. For example, the output may be input to a standard high current relay 26 that controls an audible or visible output signal device, e.g., a lamp 28. Many other output signal devices will be obvious to a person of ordinary knowledge in communications.

Exemplary components for (i) the SQUID, (ii) the FLL interface, (iii) the dewar, and (iv) the narrow band demodulator are further discussed below.

Figure 6A:
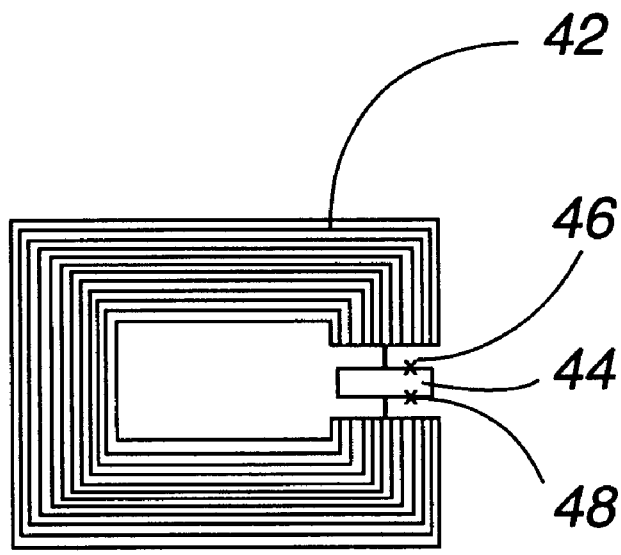
FIGS. 6A and 6B are side views of a prior art SQUID and a SQUID according to the present invention, respectively.
Figure 6B:
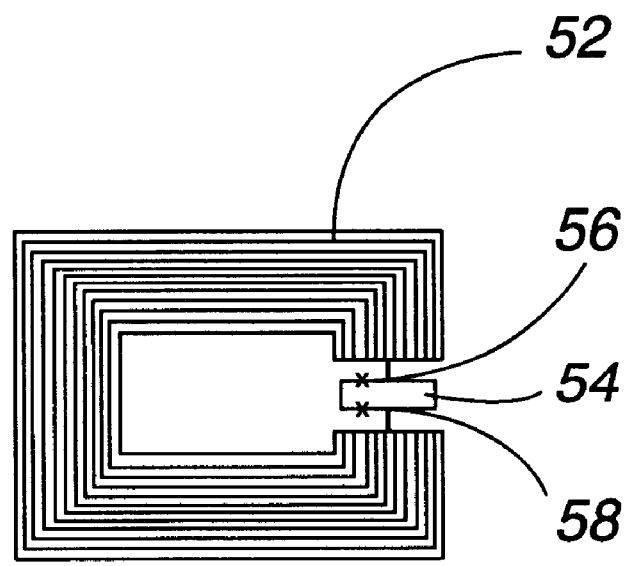

(i) The SQUIDs were fabricated using the SNS HTS devices discussed above, and having Josephson junctions oriented as discussed for FIG. 6B. All the SQUID magnetometers 10 (FIG. 3) in an exemplary device had a galvanically coupled design, where a large pickup loop is used to collect flux and generate a current running through one side of the SQUID. Four SQUIDs were connected in series with the pick-up loop. This does not degrade the performance of each SQUID individually as the devices are a small load on the large inductance of the pick-up loop. The effective area was small in this design, 42,200 $\mu m^3$, and the field noise of the SQUID was slightly less than 1 $pT/\sqrt{Hz}$.

(ii) FLL 16 was a commercial product (Quantum Design, San Diego, Calif.; Model 550). This required the fabrication of a cryogenic transformer, properly matched to the SQUID, and a coil that is used to apply the FLL modulation flux. FLL 16 required +/−15 V for operation and may be converted to +/−12 V operation. Dynamic range limitations require that FLL 16 be used on one of the lower gain scales and, hence, FLL 16 contributed to the overall noise of the receiver to somewhat reduce the sensitivity of the test device.

(iii) Dewar 12 (International Cryogenics, Indianapolis, Ind.) was constructed of G-10 fiberglass epoxy composite with a superinsulated vacuum space. The dewar was filled with a cryoretentive material, i.e., an 80% porous solid that absorbs liquid nitrogen and prevents spillage. The impact of dewar 12 on the system could be further reduced by requiring a shorter time for operations.

Figure 4:
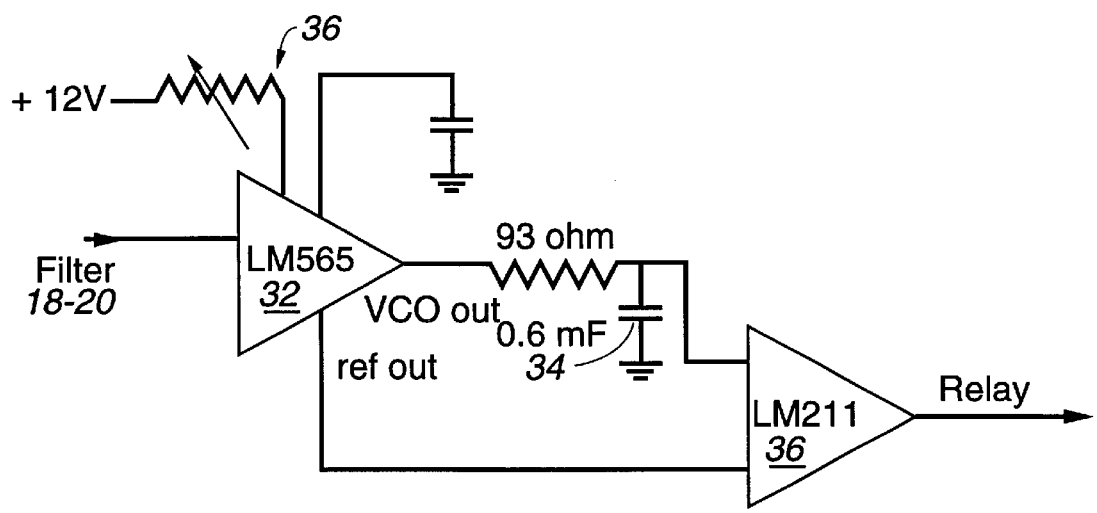
FIG. 4 is a schematic drawing of one embodiment of a demodulation circuit for providing an output communication signal.

(iv) Demodulation circuit 24, shown in FIG. 4, was based on a standard frequency shift keying design with the National Semiconductor LM 565 circuit 32. In this case, the bandwidth was much narrower than normally used and the standard circuitry was modified as shown in FIG. 4. The major addition is a very large capacitance 34 (0.6 mF) on the VCO output. Additional components, not shown for clarity, form standard biasing networks. The output of LM565 32 is a differential voltage proportional to the frequency difference between the center frequency selected by RC circuit 36 and the frequency of the input signal from filters 18–20. The variable resistor allows the selection of frequencies in the low KHz region. To detect small frequency changes the differential output of LM565 32 was sent to LM211 voltage comparator 36. The output of comparator 36 swings a full 9 volts with only a 1 mV change at the input.

Figure 5:
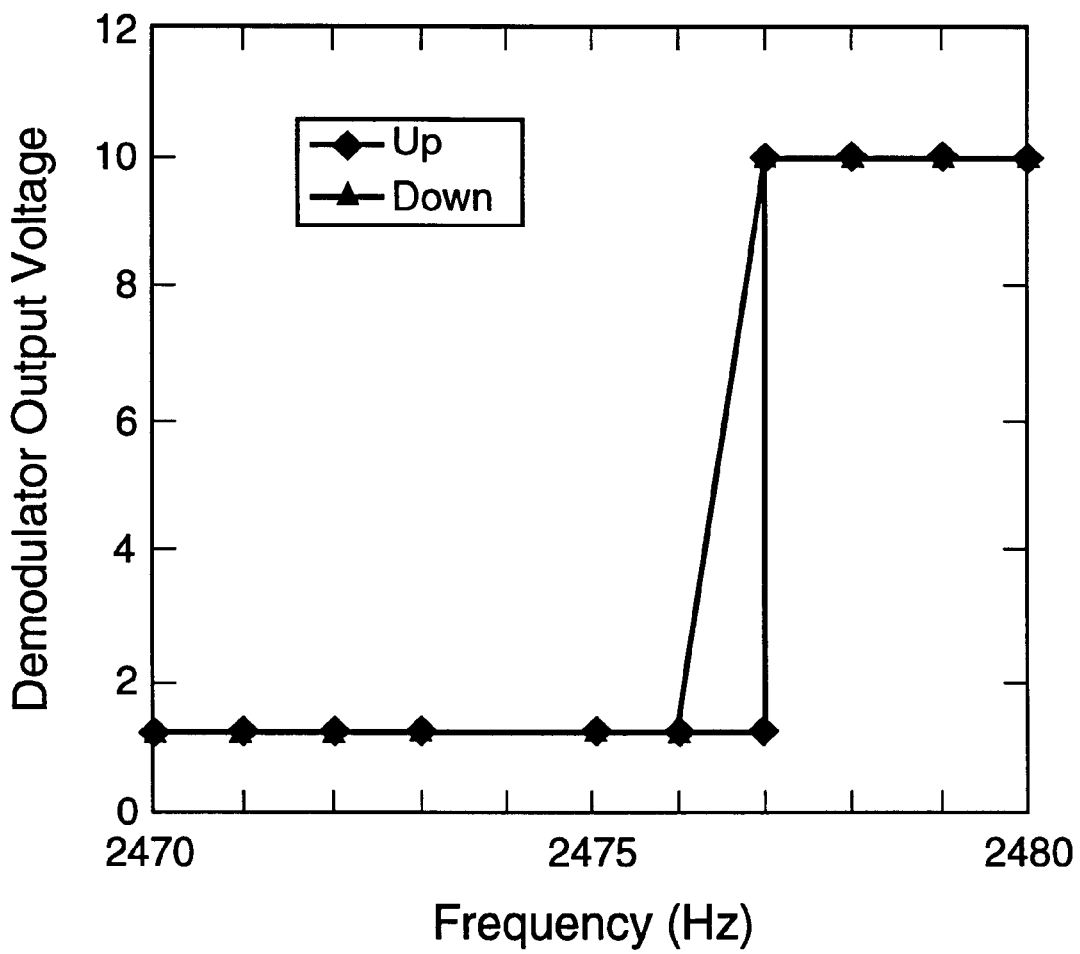
FIG. 5 is an exemplary output characteristic for the demodulation circuit shown in FIG. 4.

Demodulator 24 was tested by applying a synthesizer signal to the assembled circuit. The results for a typical frequency sweep near 2.5 kHz are shown in FIG. 5. The hysteresis on sweeping up and down is less than 1 Hz. An indeterminate region, where the output fluctuates between states, occurs at 2477 Hz on the sweep up. This region is never more than 1 Hz wide. Demodulation circuit 24, relay 26, and lamp 28 (all FIG. 3) use +12 V, with the majority of the current (1 amp) going to lamp 28. Demodulator 24 requires about 20 mV peak-to-peak to maintain FM lock, but requires 50 mV to find a lock on a pure sine wave input. The amplitude necessary to find a lock is 100 mV in even a slightly noisy environment.

A complete receiver has been assembled and tested by applying a magnetic field with a small coil resting on a lab bench near the dewar and with a coil outside the room. The coil signal was frequency shift keyed to generate a simple on/off data train The tests were performed at 3010 Hz, i.e., a frequency that is not a harmonic of 60 Hz power line frequency. The receiver locked and tracked the applied signal, generating flashes of the lamp. The data received in a bandwidth of 0.1 Hz were error free for observation times of several minutes, a time suitable for paging messages or emergency signals. The ac signal used for these tests produced approximately 100 pTesla. The integrated 60 Hz power line noise background was over 100 nTesla. The circuit tracked a signal of 100 pTesla through the room wall. The room wall was roughly equivalent to 100 m of overburden.

FIGS. 6A and 6B illustrate a particular feature of the present invention that enhances the extended term use of a superconducting receiver, as is required for operation in the earth's magnetic field. High temperature superconducting magnetometers are usually constructed in a galvanically coupled design. The actual magnetic flux sensing element is a SQUID that consists of two Josephson junctions connected in parallel to form a superconducting ring. A detailed analysis of the SQUID behavior leads to a requirement that the devices be physically small, typically of the order of 100 microns. Such a small device is a good flux meter, but a poor magnetometer. To increase the effective area, a larger superconducting coil is connected in parallel with one side of the SQUID, bypassing the junctions, as conventionally shown in FIG. 6A. In such conventional arrangement, the Josephson junctions 46, 48 are oriented on the side of ring 44 that faces outwardly from the center of superconducting coil 42.

In a preferred embodiment of the present invention, the operational duration of a SQUID has been enhanced to minimize the effects of flux trapping on SQUID output voltage during extended operations in the earth's magnetic field. As shown in FIG. 6A, high temperature superconducting magnetometers are usually constructed in a galvanically coupled design. The actual magnetic flux sensing element is a SQUID that consists of two Josephson junctions 46, 48 connected in parallel to form superconducting ring 44. Since an effective SQUID is physically small, e.g., typically of order 100 microns, the effective area of the SQUID for detecting magnetic flux is increased by adding a larger superconducting ring 42 that is connected in parallel with one side of the SQUID bypassing junctions 46, 48. In the prior art, junctions 46, 48 are on the outside of superconducting ring 44 to simplify wire bonding to the chip in which the components are formed.

But this design is susceptible to flux trapping, a common problem with SQUID magnetometers. In superconducting materials, an applied magnetic flux is quantized into individual vortices that are surrounded by a circulating current. The quantum of flux is very small, and, in the presence of the earth's magnetic field, flux quanta can penetrate the superconducting material and move around between trapping sites and create electrical noise. Traps may be introduced intentionally by creating defects, such as pinholes, in a superconducting film, but most trapping sites result simply from growth defects in the superconducting film.

Flux quanta that move between trapping sites will create noise, usually with a $1/f$ spectra when averaged over a large number of such flux quanta. The output voltage of a SQUID is optimized when the SQUID is operated near the critical current of the junctions forming the SQUID. If flux quanta are trapped near a Josephson junction, the circulating currents can also act to decrease the junction critical current. The reduced critical current results in smaller output voltage and an concomitant reduction in the bias current. If the flux quanta re trapped very close to a junction, the output voltage is suppressed to a value that is too small for the control electronics to lock onto in order to provide repeatable outputs. Once a SQUID becomes essentially inoperable due to flux trapping, the SQUID must be thermally cycled to release the flux quanta and restore the SQUID to operation. It will be appreciated that such operator intervention is unacceptable for devices used at remote and confined field locations that are subject to the earth's magnetic field.

In accordance with the present invention shown in FIG. 6B, this effect is minimized or eliminated. Again, Josephson junctions 56, 58 are connected in parallel in superconducting ring 54. Superconducting ring 52 is connected to ring 54 to provide adequate magnetic flux for operating the resulting SQUID. But in accordance with one aspect of the invention, junctions 56, 58 are located on the inside of superconducting ring 54. Now magnetic flux may still be trapped on the outside locations of SQUID, but junctions 56, 58 are remote from the trapped flux quanta. As the external magnetic field changes, flux quanta penetrate into the outside edge of ring 54, where trapping may occur, but no flux penetrates into the inside edge of ring 54 until the critical current within pick-up loop 52 is exceeded. SQUIDs formed with inside junction have been operated for extended periods of time without operator intervention to exchange or thermally cycle the SQUIDs.

Figure 7:
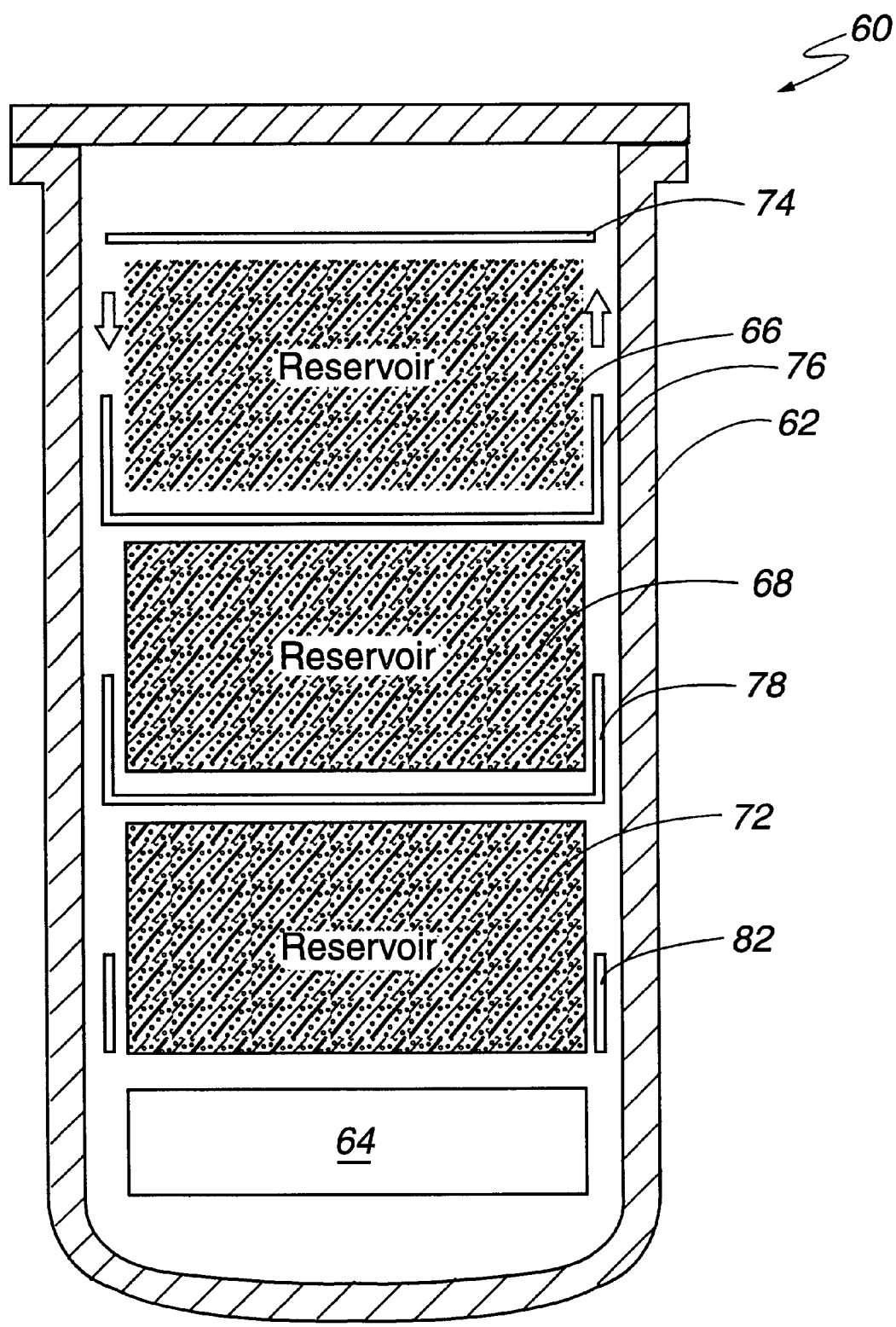
FIG. 7 is a cross-section of a dewar according to the present invention for use in confined spaces.

Yet another improve may be incorporated for operation in remote, confined locations with an improved dewar, as shown in cross-section in FIG. 7. The simplest and least expensive way to cool high temperature superconducting electronics is a dewar filled with liquid nitrogen. However, one issue of prime importance in confined spaces, such as a mineshaft, is the release of gasses that may alter the breathability of the atmosphere. A gas such as nitrogen will displace the existing air, reducing the oxygen partial pressure. Using liquid air as a cryogen is then of some interest, but liquid oxygen and liquid nitrogen have boiling points of 90 K and 77 K, respectively. At all mixing ratios the mixture will evaporate unevenly, with the nitrogen leaving first and the oxygen fraction building up in the dewar.

This scenario assumes the cryogen is stored in one volume and freely mixes at all times. For example, a mixture of 20% oxygen and 80% nitrogen in one atmosphere of pressure will generate gas initially that is 5% oxygen and 95% nitrogen. Since the gas mixtures are only breathable in a range above 10% oxygen, the initial gas that is vented from the dewar is not breathable, while later evolving gas is enriched in oxygen to hazardous levels.

In accordance with one aspect of the present invention, a more uniform mixture of evolving gases is obtained by introducing nitrogen and oxygen mixtures into a segmented dewar 60, shown in FIG. 7, to cool the superconducting electronics 64. In small superinsulated dewar bottles 62, the heat leak is dominated by conduction down the side of the dewar bottle. By imposing barriers 74, 76, 78, 82 to gas and liquid flow, one can segment $N_2/O_2$ mixed cryogen dewars into small reservoirs 66, 68, 72 in series with the heat leak. In a preferred embodiment, liquid cryogens are stored in a commercial dewar with internal foam material holding the cryogens, such as available, e.g., from International Cryogenics, to prevent the liquid cryogens from spilling from the dewar under unusual attitudes. If liquid cryogens are in a segmented volume and not allowed to mix by either gas or liquid flow, then upper volume segment 66 will evaporate first, leaving lower segments 68, 72 mostly filled with cryogens. Then, as the cryogens in the lower segments evaporate, the gas evaporating from the upper segments is oxygen rich so that the venting gas would be a breathable mixture. Indeed, the design of dewar 60 enable the venting gases to serve as an air source to enhance the atmosphere for underground workers.

FIG. 8 graphically depicts an output spectra showing background noise and received signals with the transmitter on and with the transmitter off. Here, the transmitter and the receiver were both located underground, but separated by about 640 meters of earth. At frequencies below 1 kHz, the received signal is noise plus power line harmonics whether the transmitter is on or off. But at about 3 kHz, the transmitter signal is clearly received above the noise level and free of power line harmonics. A receiver operating around 3 kHz could be operated without all of the filters described above to remove power line harmonics.

The foregoing description of a superconducting receiver for low frequency radio waves has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A communicating device, comprising:
    a low-noise SQUID using high temperature superconductor components connected to detect a modulated external magnetic flux for outputting a modulated voltage signal that is related to the modulated magnetic flux, where said SQUID has Josephson junctions that are located remote from external flux trapping sites on said SQUID; and
    a receiver receiving the modulated voltage signal and outputting a communication signal indicative of the modulation on the modulated external magnetic flux.

2. A communicating device according to claim 1, wherein the modulated external magnetic flux is frequency modulated.

3. A communicating device according to claim 1, wherein the high temperature superconductor components are fabricated using a superconductor-normal-superconductor edge junction process.

4. A communicating device according to claim 1, further including a dewar having segmented volumes of liquid $N_2/O_2$ arranged in a stacked configuration effective to generally produce a breathable mixture of venting gas.

5. A communicating device according to claim 1, wherein the receiver has a bandwidth in the range of 0.1 to 60 Hz.

6. A communication device according to claim 1, wherein the receiver includes at least one narrow bandwidth filter for selecting a portion of the voltage signal spectrum that is relatively free of noise to output a relatively low noise output signal having a modulation related to the modulated voltage signal.

7. A communicating device according to claim 6, wherein the modulated external magnetic flux is frequency modulated.

8. A communicating device according to claim 6, wherein the filter has a bandwidth in the range of 0.1 to 60 Hz.

9. A communicating device according to claim 6, wherein the filter is a plurality of narrow bandwidth filters each passing a portion of the modulated voltage signal that is relatively free of noise to output a relatively high bandwidth composite signal.

* * * * *